(12) United States Patent
Laxton

(10) Patent No.: US 9,184,797 B1
(45) Date of Patent: Nov. 10, 2015

(54) TRAIN OR TRAILER COMMUNICATION SYSTEM

(71) Applicant: Barry M. Laxton, Unionville (CA)

(72) Inventor: Barry M. Laxton, Unionville (CA)

( * ) Notice: Subject to any disclaimer, the term of this patent is extended or adjusted under 35 U.S.C. 154(b) by 281 days.

(21) Appl. No.: 13/847,788

(22) Filed: Mar. 20, 2013

Related U.S. Application Data

(60) Provisional application No. 61/614,514, filed on Mar. 23, 2012, provisional application No. 61/707,991, filed on Sep. 30, 2012.

(51) Int. Cl.
*H04B 5/00* (2006.01)
*B61L 3/12* (2006.01)
*B61G 7/00* (2006.01)

(52) U.S. Cl.
CPC ............ *H04B 5/0012* (2013.01); *B61G 7/00* (2013.01); *B61L 3/125* (2013.01)

(58) Field of Classification Search
CPC ...... H04B 5/0012; H04B 5/0031; H04B 5/02; H04B 5/00; B61L 25/028; B61L 2027/005; B61L 21/10; B61L 25/00; B61L 3/12; B61L 3/125

USPC ............ 246/167 R, 187 C; 701/19; 370/242; 336/200; 340/298; 455/41.1, 500
See application file for complete search history.

(56) References Cited

U.S. PATENT DOCUMENTS

| | | | |
|---|---|---|---|
| 5,720,455 A * | 2/1998 | Kull et al. ................. | 246/187 C |
| 8,073,582 B2 * | 12/2011 | Kellner et al. ................. | 701/19 |
| 8,428,798 B2 * | 4/2013 | Kull ............................... | 701/19 |
| 8,983,759 B2 * | 3/2015 | Smith et al. ................... | 701/117 |
| 2002/0027495 A1 * | 3/2002 | Darby et al. .................. | 340/298 |
| 2005/0121971 A1 * | 6/2005 | Ring ............................. | 303/7 |
| 2006/0170285 A1 * | 8/2006 | Morimitsu et al. ............. | 307/3 |
| 2009/0195344 A1 * | 8/2009 | Marvel et al. ................. | 336/200 |
| 2010/0091663 A1 * | 4/2010 | Takeyama et al. ............ | 370/242 |
| 2011/0183605 A1 * | 7/2011 | Smith et al. ........................ | 455/7 |
| 2015/0073629 A1 * | 3/2015 | Kraeling ........................ | 701/19 |

* cited by examiner

*Primary Examiner* — Mark Le

(57) ABSTRACT

An apparatus that enables a train or trailer vehicle to communicate with other vehicles in the same train without using vehicle identifiers other than the relative positions of the two vehicles within the train. It uses short-range communication methodologies to communicate signals between a vehicle and the adjacent vehicle. Vehicles in the same train that are not adjacent intercommunicate via relay.

1 Claim, 1 Drawing Sheet

TRAIN OR TRAILER COMMUNICATION SYSTEM

BACKGROUND OF THE INVENTION

A train, or any string of vehicles with one or more coupled trailers, usually requires communication between the coupled vehicles. The communication may consist of commands and status report.

Examples of commands include instructions to turn on or turn off lights, brakes or refrigeration units, instructions to operate an automated uncoupling mechanism between two of the vehicles, and requests for the recipient to send a status report.

Examples of a status report include the current temperature, the identification of the next scheduled stop, and whether or not a light bulb is burnt out.

Existing methods of conveying communication include electrical signals sent over wires, changes in air pressure in air hoses, and radio signals between transmitter and receiver.

There are situations where it is infeasible or undesirable to physically connect communication wires or hoses, so radio is often used. However, it is difficult to target radio signals to a specific vehicle in the train, if it is farther away than the vehicle adjacent to the sender, without interception by other vehicles in the same or any other train, so such communication usually requires the use of an addressing or other identification technique.

There is a need to provide for communication between vehicles in a train that requires neither of the direct connection of wires or hoses between the vehicles nor the addressing of radio communication.

BRIEF SUMMARY OF THE INVENTION

The invention comprises multiple instances of an Apparatus, one per vehicle of a train, that relay Messages to each other using short-range Transmitters and Receivers. Each interfaces with appliances and sensors in the various vehicles of a train and passes command and report messages between them.

Communication to a non-adjacent vehicle in the same train is effected by first transmitting the message to the adjacent vehicle, with an annotation that the communication must be relayed further down the train. The Apparatus in the adjacent vehicle forwards the communication to another instance of the Apparatus in the next-adjacent vehicle. The intended recipient is thereby identified by its position in the train relative to the originator.

DETAILED DESCRIPTION OF THE INVENTION

Figure 1:
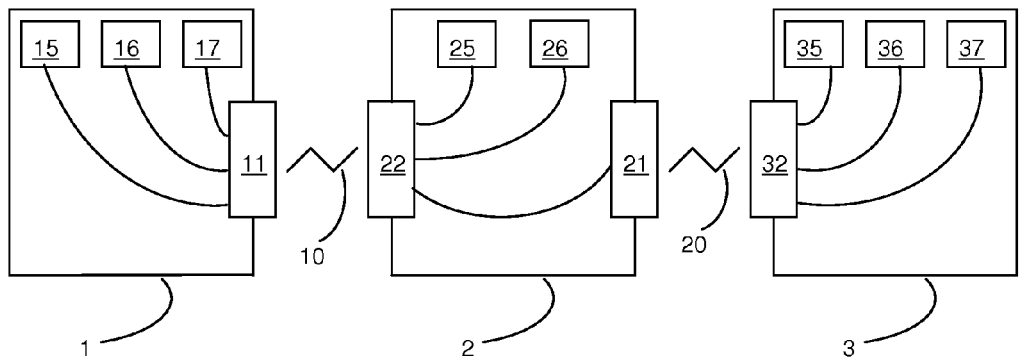
FIG. 1. The Relay Method showing 3 vehicles in a train with instances of the Apparatus, Transmitters, Receivers and connected devices.
Figure 2:
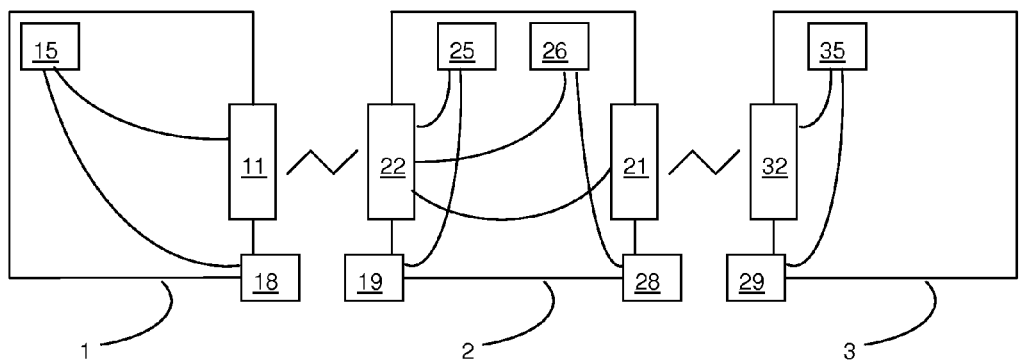
Figure 3:
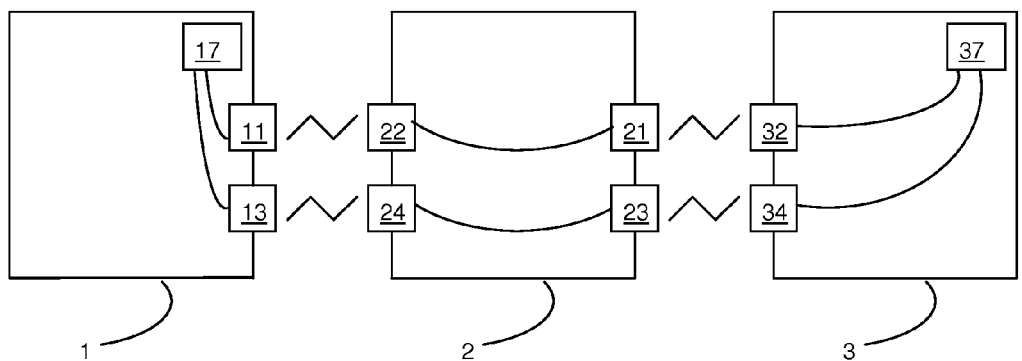

Vehicles are considered to form a train if they are coupled together or if they are adjacent to each other in positions similar to where they would be if they were coupled, about to be coupled, or recently uncoupled from each other. In FIG. 1, Vehicle 1, Vehicle 2 and Vehicle 3 form a train. Vehicle 1 is adjacent to Vehicle 2, Vehicle 2 is adjacent to Vehicle 3, but Vehicle 1 is not adjacent to Vehicle 3.

In FIG. 1, items 11, 21 and 31 are instances of the Apparatus. Apparatus 11 is connected to devices 15 and 16, Apparatus 21 is connected to devices 25 and 26 and Apparatus 31 is connected to device 35. Each vehicle may contain zero or more devices.

Instances of the Apparatus intercommunicate using Messages which may originate from a device that is connected to the originating Apparatus or the Apparatus itself. Similarly, the destination may be an Apparatus or a device that is connected to the destination Apparatus. In addition to the content that an Apparatus wishes to send to another Apparatus, a Message contains a Destination Relay Counter value. The Destination Relay Counter value specifies the number of relays to be performed before the receiving Apparatus concludes that the Message is intended for it or one of the devices connected to it.

Refer to FIG. 1. If Apparatus 11 in Vehicle 1 wishes to send a Message to Apparatus 21 in Vehicle 2, i.e. the adjacent vehicle, Apparatus 11 initializes the Message's Destination Relay Counter value to a Terminal Value, e.g. 0 and passes the Message to Transmitter 12, which is mounted on or near the end of Vehicle. Transmitter 12 then sends (10) the message toward Receiver 23, which passes it to Apparatus 21. Apparatus 21 notices that the Message's Destination Relay Counter value equals the Terminal Value, and deduces that the Message was targeted to it or one of the devices connected to it.

If the Message is instead meant to be sent to a vehicle that is not the adjacent vehicle, the Message's Destination Relay Counter value is initialized to values other than the Terminal Value. If Apparatus 11 in Vehicle 1 wishes to send a Message to Apparatus 31 in Vehicle 3, Apparatus 11 initializes the Message's Destination Relay Counter value to the number of relays, in this case 1, which must be performed before the Message reaches its intended target. When Apparatus 21 receives the Message it notices that the Message's Destination Relay Counter value does not equal the Terminal Value, and decrements it or otherwise adjusts it so that it becomes closer to the Terminal Value. Apparatus 21 then relays (20) the so-modified Message to Apparatus 31 via Transmitter 22 and Receiver 33. Apparatus 31 notices that the Message's Destination Relay Counter value equals the Terminal Value and deduces that the Message was targeted to it or one of the devices connected to it.

Through the use of the appropriate Destination Relay Counter value, it is possible to convey Messages to any specific vehicle in the train. To determine the Destination Relay Counter value to use for any particular destination vehicle, the originating Apparatus counts the number of relays from the adjacent vehicle needed before the Message reaches the targeted vehicle. It is important to note that any methodology may be used as a counting scheme for the Relay Counters, as long as there is a knowable and predictable sequence to it.

In some embodiments, bi-directional communication is implemented by connecting two Transmitters and two Receivers to each Apparatus, one of each at each end of the vehicle.

This invention applies to both real-world vehicles and models.

In an embodiment of the present invention, a train communication system includes a train provided with at least three or more railcars connected to each other, wherein a first end one of said railcars includes a transmitter in communication with a plurality of controllers, an intermediate one of said railcars includes a receiver in communication with a plurality of controllers and with a transmitter, and a second end one of said railcars includes a receiver in communication with a plurality of controllers. Each of the controllers of said first end railcar is configured to present a message to the transmitter of the same car for transmitting to the receiver of an adjacent intermediate one of the railcars. The message contains a destination relay counter, and a controller information section, wherein the destination relay counter has a value that corresponds to the number of adjacent railcars predetermined to receive the message in a sequential order and is configured to be decreased by one when the message is transmitted and received by an adjacent one of the railcars. The receiver of one of the railcars receiving the message is configured to continue sending the message to an adjacent one of the railcars when the destination relay counter is not reduced to a terminal value, and to stop sending the message to another adjacent one of the railcars when the destination relay counter is reduced to a terminal value.

The invention claimed is:
1. A train communication system comprising:
a train including at least three or more railcars connected to each other, wherein a first end one of said railcars includes a transmitter in communication with a controller, an intermediate one of said railcars includes a receiver in communication with a controller and with a transmitter, and a second end one of said railcars includes a receiver in communication with a controller; and
wherein the controller of said first end railcar is configured to present a message to the transmitter of the same car for transmitting to the receiver of an adjacent intermediate one of the railcars, the message contains a destination relay counter, and a controller information section, wherein the destination relay counter has a value that corresponds to the number of adjacent railcars predetermined to receive the message in a sequential order and is configured to be decreased by one when the message is transmitted and received by an adjacent one of the railcars, and wherein the receiver of one of the railcars receiving the message is configured to adjust the counter value and to continue sending the message with the adjusted counter value to a transmitter of an adjacent one of the railcars when the destination relay counter received by the receiver is not already reduced to a terminal value, and to stop sending the message to another adjacent one of the railcars and present the message to the controller of the same railcar when the destination relay counter received by the receiver is already reduced to a terminal value.

* * * * *